United States Patent
Imai et al.

[15] 3,697,530
[45] Oct. 10, 1972

[54] OXADIAZOLE DERIVATIVES

[72] Inventors: Yoshio Imai, Hyogo; Haruki Matsumura, Osaka; Shojiro Yurugi, Kyoto; Akio Miyake, Osaka, all of Japan

[73] Assignee: Takeda Chemical Industries, Ltd., Higashi-ku, Osaka, Japan

[22] Filed: Dec. 31, 1970

[21] Appl. No.: 103,294

[52] U.S. Cl. ..260/295 R, 260/247.2 R, 260/247.2 A, 260/250 R, 260/256.4 R, 260/268 H, 260/293.67, 260/295 AM, 260/307 G, 424/248, 424/250, 424/251, 424/266, 424/267, 424/269
[51] Int. Cl. ....................C07d 31/34, C07d 85/52
[58] Field of Search........260/295 R, 295 AM, 307 G

[56] References Cited

UNITED STATES PATENTS 3,265,692  8/1966  Harsanyi et al........260/307 G

FOREIGN PATENTS OR APPLICATIONS 1,051,322  12/1966  Great Britain.........260/307 G

*Primary Examiner*—Alan L. Rotman
*Attorney*—Milton J. Wayne

[57] ABSTRACT

The present invention is concerned with certain 5-aryl or heteroaryl-1,2,4 oxadiazoles and derivatives and methods for their preparation. The compounds possess hypocholesterolemic activity.

34 Claims, No Drawings

OXADIAZOLE DERIVATIVES

The present invention relates to novel oxadiazole derivatives and their pharmaceutically acceptable salts, which have effective hypocholesterolemic action.

The present invention also relates to a process for the production of these oxadiazole derivatives.

There have been many kinds of anti-arteriosclerotic agents or hypocholesterolemic agents. However, most of known hypocholesterolemic agents or anti-arteriosclerotic agents are not very satisfactory in the potency of the action, the action-mechanism, toxicity to human body, etc. Under the circumstances, the present inventors have made extensive studies for providing an effective hypocholesterolemic agent or anti-atherosclerotic agent and succeeded in synthesizing novel oxadiazole derivatives defined as below.

Further, in regard to these novel compounds, the present inventors have arrived at the following findings: these compounds have unique and strong hypocholesterolemic action, i.e. action of lowering cholesterol in living body; they have quite a low toxicity to mammals; and therefore they can be used as a safe and effective medicine for improving and/or preventing atherosclerosis.

The present invention has been accomplished on the basis of these findings.

Thus, the principal object of the present invention is to provide novel oxadiazole derivatives useful as a safe and effective hypocholesterolemic agent or anti-atherosclerotic agent and another object is to provide a method for the production of these novel compounds.

The oxadiazole derivatives of the present invention are those represented by the following general formula [I] :

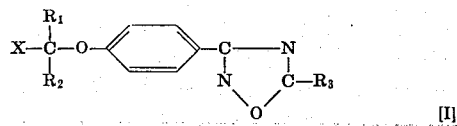

[wherein X stands for an esterified or non-esterified carboxyl group or a carboxamido group, each of $R_1$ and $R_2$ stands for a hydrogen atom, an aryl group or an alkyl group, and $R_3$ stands for a hydrocarbon residue or a heterocyclic group, which may be substituted] and their pharmaceutically acceptable salts.

In the general formula [I], the esterified carboxyl group can be shown by the general formula X'OOC- [wherein X' is a hydrocarbon residue].

The hydrocarbon residue is preferably that having one to eight carbon atoms, which includes alkyl, aryl and aralkyl group. The alkyl group represented by the symbol X' may be any of straight or branched chain, cyclic, saturated or unsaturated ones. The typical examples of the groups are methyl, ethyl, propyl, butyl, isopropyl, isobutyl, sec-butyl, tert-butyl, pentyl, cyclopentyl, hexyl, cyclohexyl, 1-propenyl, 2-propenyl, 1-butenyl, 2-butenyl, and 3-butenyl. The typical examples of the aryl group are phenyl and naphthyl, and the typical ones of the aralkyl group are benzyl and phenethyl.

The carboxamido group can be shown by the general formula X''OC—(wherein X'' stands for an amino or a substituted amino group). The substituted amino group represented by the symbol X'' includes alkylamino, dialkylamino, arylamino, aralkylamino or cyclic amino group, etc. The typical examples of the groups are methylamino, dimethylamino, diethylamino, 2-hydroxyethylamino, bis(2-hydroxyethyl)amino, benzylamino, phenylamino and morpholino.

The alkyl groups represented by the symbol $R_1$ and $R_2$ may be any of straight or branched chain, cyclic, saturated or unsaturated ones.

The typical examples of the groups are methyl, ethyl, propyl, isopropyl, butyl, isobutyl, sec-butyl, tert-butyl, pentyl, hexyl, heptyl, oxtyl, cyclopentyl, cyclohexyl, 1-butenyl, 2-butenyl, 3-butenyl, 1-propenyl, and 2-propenyl. Among these groups, the lower alkyl groups having one to eight carbon atoms are generally preferable. The aryl groups represented by the symbol $R_1$ and $R_2$ may be, for instance, phenyl, naphthyl, etc.

The hydrocarbon residue represented by the symbol $R_3$ includes, for instance, alkyl, aryl and aralkyl group, etc. The alkyl groups may be any of straight or branched chain, cyclic, saturated or unsaturated ones. The typical examples of the alkyl group are methyl, ethyl, propyl, isopropyl, butyl, isobutyl, sec-butyl, tert-butyl, pentyl, cyclopentyl, hexyl, cyclohexyl, cyclohexylmethyl, cyclo-hexylethyl, 1-butenyl, 2-butenyl, 3-butenyl, 1-propenyl, 2-propenyl, heptyl, octyl, monyl, decyl, undecyl, dodecyl, tridecyl, tetradecyl, pentadecyl, hexadecyl, heptadecyl, oleyl, linoleyl, linolenyl.

Among these groups, the alkyl groups having five to 17 carbon atoms are preferable, and those having five to 7 carbon atoms and long straight chain ones having 15 to 17 carbon atoms are more desirable.

The typical examples of the aryl group are phenyl, and naphthyl, and the typical ones of the aralkyl groups are benzyl and phenethyl.

The heterocyclic group represented by the symbol $R_3$ includes five or six membered monocyclic ones containing one hetero atom of N, S or O, five or six-membered monocyclic ones containing two or more, preferably two to three, hetero atoms of N, S or O, etc.

Among these heterocyclic groups, preferable ones are those wherein a carbon atom of the heterocyclic ring links directly with the carbon atom of the 5-position of the oxadiazole ring.

The typical example of these heterocyclic groups are, 2-thienyl, 3-thienyl, 2-pyridyl, 3-pyridyl, 4-pyridyl, 2-furyl, 3-furyl, pyrimidyl, 2-pyrazinyl, 2-morpholino, 3-morpholino, 2-piperidyl, 3-piperidyl, 4-piperidyl, 2-pyrrolidyl, 3-pyrrolidyl and 2-piperazyl.

These hydrocarbon residues or heterocyclic groups represented by the symbol $R_3$ may be substituted. The substituent includes, for instance, carboxyl group, halogen atom (i.e. chlorine, bromine, fluorine, iodine), nitro group, amino group, hydroxyl group, lower alkyl group (e.g. methyl, ethyl, propyl, butyl, sec-butyl, tert-butyl, etc.), lower alkoxy group (e.g. methoxy, ethoxy, propoxy, butoxy, etc.), aryl group (e.g. phenyl, etc.), aralkyl group (e.g. benzyl, phenethyl, etc.), etc. One or more of these substituents may be attached at any optional position(s) of these hydrocarbon residues or heterocyclic groups.

Among the substituted hydrocarbon and substituted heterocyclic groups, most preferable and practical ones are alkyl-substituted aryls (e.g. tolyl, xylyl, butyl phenyl, etc.), halogen-substituted aryls (e.g. chlorophenyl, dichlorophenyl, etc.), N-alkyl substituted piperazyls (e.g. N-methyl-2-piperazyl, N-ethyl-2-piperazyl, etc.), N-aralkyl substituted piperazyls (e.g. N-benzyl-2-piperazyl, etc.), nitro-substituted aryls (e.g. nitrophenyl, etc.), amino-substituted aryls (e.g. aminophenyl, etc.), alkoxy-substituted aryls (e.g. methoxyphenyl, ethoxyphenyl, propoxyphenyl, butoxyphenyl, etc.), etc.

The pharmaceutically acceptable salts of the present compounds include addition salts with an inorganic acid such as hydrochloric acid, sulfuric acid, nitric acid, phosphoric acid etc., and with organic acid such as oxalic acid, maleic acid, malic acid, tartaric acid, methane-sulfonic acid, ethanesulfonic acid, etc.

Typical compounds represented by the general formula [I] are exemplified below:
1. 3-[4-(Ethoxycarbonyl-1,1-dimethyl-methoxy)phenyl]-5-(3-pyridyl)-1,2,4-oxadiazole
2. 3-[4-(Ethoxycarbonyl-1,1-dimethyl-methoxy)phenyl]- 5-(4-pyridyl)-1,2,4-oxadiazole
3. 3-[4-(Ethoxycarbonyl-1,1-dimethyl-methoxy)phenyl]-5-methyl-1,2,4-oxadiazole
4. 3-[4-(Ethoxycarbonyl-1,1-dimethyl-methoxy)phenyl]-5-isopropyl-1,2,4-oxadiazole
5. 3-[4-(Ethoxycarbonyl-1,1-dimethyl-methoxy)phenyl]-5-phenyl-1,2,4-oxadiazole
6. 3-[4-(Ethoxycarbonyl-1,1-dimethyl-methoxy)phenyl]-5-(2-furyl)-1,2,4-oxadiazole
7. 3-[4-(1-Ethoxycarbonyl-ethoxy)phenyl]-5-(3-pyridyl)-1,2,4-oxadiazole
8. 3-[4-(Carboxyl-1,1-dimethyl-methoxy)phenyl]-5-phenyl-1,2,4-oxadiazole
9. 3-[4-(1-Ethoxycarbonyl-butoxy)phenyl]-5-(3-pyridyl)-1,2,4-oxadiazole
10. 3-[4-(Carbamoyl-1,1-dimethyl-methoxy)phenyl]-5-(3-pyridyl)-1,2,4-oxadiazole
11. 3-[4-(Carboxyl-1,1-dimethyl-methoxy)phenyl]-5-(3-pyridyl)-1,2,4-oxadiazole
12. 3-[4-(Buthoxycarbonyl-1,1-dimethyl-methoxy)phenyl]-5-(3-pyridyl)-1,2,4-oxadiazole
13. 3-[4-(Benzyloxycarbonyl-1,1-dimethyl-methoxy)phenyl]-5-(3-pyridyl)-1,2,4-oxadiazole
14. 3-[4-(Ethoxycarbonyl-1,1-dimethyl-methoxy)phenyl]-5-(2-chlorophenyl)-1,2,4-oxadiazole
15. 3-[4-(Ethoxycarbonyl-1,1-dimethyl-methoxy)phenyl]-5-(3-nitrophenyl)-1,2,4-oxadiazole
16. 3-[4-(Ethoxycarbonyl-1,1-dimethyl-methoxy)phenyl]-5- (2-thienyl)-1,2,4-oxadiazole
17. 3-[4-(Ethoxycarbonyl-1,1-dimethyl-methoxy)phenyl]-5-heptyl-1,2,4-oxadiazole
18. 3-[4-(Ethoxycarbonyl-1,1-dimethyl-methoxy)phenyl]-5-cyclohexylmethyl-1,2,4-oxadiazole
19. 3-[4-(1-Ethoxycarbonyl-nonyloxy)phenyl]-5-(3-pyridyl)-1,2,4-oxadiazole
20. 3-[4-(Ethoxycarbonyl-1-phenyl-methoxy)phenyl]-5-(3-pyridyl)-1,2,4-oxadiazole
21. 3-[4-(Ethoxycarbonyl-1-cyclohexyl-methoxy)phenyl]-5-(3-pyridyl)-1,2,4-oxadiazole The present compounds of the general formula [I] are prepared by the reaction of a compound of the general formula [II]

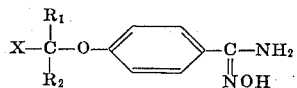

[II]

[wherein $R_1$, $R_2$ and X have same meaning as above] with a carboxylic acid of the general formula [III]

$$R_3 - COOH \quad [III]$$

[wherein $R_3$ has the same meaning as above] or its acid halide, acid anhydride or ester.

The acid halide of the compound [III] includes, for instance, the corresponding acid chloride, acid bromide, etc. The corresponding ester includes, for instance, alkyl esters (e.g. methyl, ethyl, propyl, butyl ester, etc.), aryl esters (e.g. phenyl, tolyl ester, etc.), etc.

The acid anhydride may be that prepared by condensation of two moles of the compound [III] or a so-called mixed acid anhydride prepared by condensation of 1 mole part of a suitable organic acid (e.g. acetic acid, propionic acid, butyric acid, benzoic acid, caproic acid, capric acid, caprylic acid, myristic acid, etc.) and 1 mole part of the compound [III].

An amount of the compound [III] or its derivative to be used for the reaction is usually about 1.2 to 1.5 moles per mole of the compound [II]. The reaction conditions may vary according to the kind of the starting compounds or other factors.

When the compound [III] itself or its acid anhydride or ester is used as one of the starting materials, the reaction is usually carried out in the absence of a solvent under heating at about 100°C or higher, more preferably at about 100 to about 150°C, but a suitable solvent (e.g. dioxane, toluene, benzene) may occasionally be used. A basic substance may also be used. The basic substance is exemplified by alkali metal hydroxides (e.g. sodium hydroxide, potassium hydroxide etc.), and alkali metal carbonates (e.g. sodium carbonate, potassium carbonate, etc.).

When an acid halide corresponding to the compound [III] is used, the reaction is carried out preferably in the presence of an acid acceptor at room temperature or under heating at about 150°C or lower.

The acid acceptor usable is exemplified by organic amines such as pyridine, picoline, and triethylamine.

When the organic amine is used in a large amount, it can act also as a reaction solvent. Other suitable inert solvent such as dioxane, toluene, benzene may also be used. The reaction time is generally about 30 minutes to several hours.

After completion of the reaction, the objective compounds of the general formula [I] may be isolated and purified by conventional manners, e.g. extraction with a suitable solvent (e.g. ethyl acetate, chloroform, etc.), followed by evaporation, recrystallization, column-chromatography, etc.

When the radical represented by the symbol $R_3$ is heterocyclic group containing one or more nitrogen atom(s) or a hydrocarbon group having one or more amino group(s) as substituent(s), the objective compounds may be converted to its addition salts with the afore-mentioned inorganic or organic acid after a conventional manner. Further, when the radical X is —COOH, the resultant may be converted to a salt with a basic compound such as inorganic alkalis (e.g. sodium hydroxide, potassium hydroxide, sodium carbonate, potassium carbonate, etc.) and organic amines (e.g. pyridine, aniline, 2-hydroxyethylamine, etc.), etc.

The compounds of the general formula [II], the starting materials of the present invention, are novel compounds and may be prepared by the step described in the following scheme:

$$X-\underset{R_2}{\underset{|}{\overset{R_1}{\overset{|}{C}}}}-O-\langle\text{phenyl}\rangle-CN + NH_2OH \longrightarrow$$

$$X-\underset{R_2}{\underset{|}{\overset{R_1}{\overset{|}{C}}}}-O-\langle\text{phenyl}\rangle-C-NH_2$$

[II]

[wherein $R_1$, $R_2$ and X have the same meaning as above].

This reaction is usually carried out in a suitable solvent under heating at about 70 to about 80°C. The solvent may be a mixture of water and a suitable organic solvent (e.g. methyl alcohol, ethyl alcohol, acetone, etc.).

The objective compounds of the general formula [I] have unique and characteristic pharmacological properties mentioned below:

1. The compounds [I] have a strong action of lowering the cholesterol level in a living body, particularly in a liver.
2. They can effectively restrain the synthesis of cholesterol in a living body, such as in liver, without production of undesirable steroids (e.g. desmosterol, etc.).
3. They prevent the accumulation of cholesterol in a living body, particularly in the liver and arota.
4. They show very low toxicity to mammals.

Taking advantage of the above characteristic properties, the objective compounds of the present invention can be used as a hypocholesterolemic agent and/or a medicine for improving or preventing atherosclerosis. These compounds are administered for this purpose in per se or in form of a pharmaceutically acceptable composition in admixture with a suitable and conventional carrier or adjuvant.

The pharmaceutical composition may take the form of tablets, granules, powders, capsules and may be administered orally or parenterally.

Usual daily doses of the present compounds lie in the range of about 50 mg. to about 1,500 mg. per human adult upon oral administration or injectional administration (e.g. intravenously, intramuscularly, etc.).

For further explanation of the present invention, the following Reference and Examples are given, wherein the word "part(s)" and "% (percent)" are based on weight unless otherwise noted, and the relation between "part" and "volume part" corresponds to that between gram and milliliter.

Reference — preparation of the starting compound—

In 250 volume parts of a mixture of ethyl alcohol and water (3:2) is dissolved 48 parts of 4-(ethoxycarbonyl-1,1-dimethyl-methoxy)benzonitrile, and to the solution are added 18.2 parts of hydroxylamine hydrochloride and 13.8 parts of anhydrous sodium carbonate. The whole mixture is heated at 70 to 80°C for 3 hours.

The resultant is concentrated under reduced pressure. The residue is extracted with ethyl acetate and the ethyl acetate layer is extracted with 150 volume parts of 10 weight percent hydrochloric acid.

The acid portion is alkalified with a 10 percent aqueous solution of sodium hydroxide and the separated oily substance is extracted with ethyl acetate. The organic layer is washed with water, dried over anhydrous sodium sulfate and then subjected to distillation under reduced pressure to leave 20.5 parts of 4-(ethoxycarbonyl-1,1-dimethyl-methoxy)benzamidoxime melting at 117 to 119°C.

Analysis: Calculated for $C_{13}H_{18}O_4N_2$:

|  | C | H | N |
|---|---|---|---|
|  | 58.63 | 6.81 | 10.62 |
| Found: | 58.79 | 6.81 | 10.30 |

After a similar manner to the above, the following compounds are prepared:

4-(1-Ethoxycarbonyl-ethoxy)benzamidoxime melting at 120 to 122°C 4-(1-Ethoxycarbonyl-pentoxy)benzamidoxime melting at 62 to 64°C 4-(1-Ethoxycarbonyl-nonyloxy)benzamidoxime melting at 75 to 76°C 4-(Ethoxycarbonyl-phenyl-methoxy)benzamidoxime melting at 133 to 134°C 4-(Ethoxycarbonyl-1-cyclohexyl-methoxy)benzamidoxime melting at 109 to 110°C

EXAMPLE 1

To a solution of 4.2 parts of nicotinic acid chloride in 20 volume parts of pyridine is added 4.0 parts of 4-(ethoxycarbonyl-1,1-dimethyl-methoxy)benzamidoxime, and the whole mixture is refluxed for 2.5 hours.

The reaction mixture is concentrated under reduced pressure and the oily residue is dissolved in 200 volume parts of a saturated aqueous solution of sodium bicarbonate. The separated oily substance is extracted with ethyl acetate and the ethyl acetate layer is dried over anhydrous sodium sulfate, followed by concentration under reduced pressure.

The oily residue is treated with oxalic acid and the separated crystals are recrystallized from ethyl alcohol. This procedure gives 2.1 parts of 3-[4-(ethoxycarbonyl-1,1-dimethyl-methoxy)phenyl]-5-(3-pyridyl)-1,2,4-oxadizole oxalate as colorless needles melting at 129 to 131°C. Yield: 35.1 percent Analysis: Calculated for $C_{19}H_{19}N_3O_4 \cdot \frac{1}{2}C_2H_2O_4$

|  | C | H | N |
|---|---|---|---|
|  | 60.30 | 5.18 | 10.79 |
| Found: | 60.36 | 4.92 | 10.55 |

EXAMPLE 2

To a solution of 2.0 parts of 4-(ethoxycarbonly-1,1-dimethyl-methoxy)benzamidoxime in 10 volume parts of pyridine is added 2.1 parts of isonicotinic acid chloride, and the whole mixture is refluxed for 2.5 hours.

The reaction mixture is poured into 200 volume parts of ice water and the whole mixture is alkalified with a 10 percent aqueous solution of sodium hydroxide. The separated crystals are dissolved in ethyl ether. The solution is treated with oxalic acid and the separated crystals are recrystallized from methyl alcohol.

This procedure gives 1.5 parts of 3-[4-(ethoxycarbonyl-1,1-dimethyl-methoxy)phenyl]-5-(4-pyridyl)-

1,2,4-oxadiazole oxalate as colorless fine needles melting at 131 to 133°C. Yield: 50.3 percent Analysis: Calculated for $C_{19}H_{19}N_3O_4 \cdot \frac{1}{2}C_2H_2O_4$:

|  | C 60.30; | H, 5.18, | N, 10.79 |
|---|---|---|---|
| Found | C 60.09; | H, 4.97; | N, 10.51 |

EXAMPLE 3

A solution of 2.0 parts of 4-(ethoxycarbonyl-1,1-dimethyl-methoxy)benzamidoxime in 10 volume parts of isopropionic acid anhydride is heated at 140°C for 2.5 hours and the reaction mixture is poured into 100 volume parts of water. The whole mixture is alkalified with a 10 percent aqueous solution of sodium hydroxide and the separated oily substance is extracted with ethyl acetate. The ethyl acetate layer is washed with water, dried over anhydrous sodium sulfate, and then concentrated under reduced pressure. The residue is treated with silica-gel column-chromatography to give 2.1 parts of 3-[4-(ethoxycarbonyl-1,1-dimethyl-methoxy)phenyl]-5-isopropyl-1,2,4-oxadiazole as a colorless oily substance. Yield: 88.9 percent.

Analysis: Calculated for $C_{17}H_{22}N_2O_4$:

|  | C 64.13, | H 6.97 | N 8.80 |
|---|---|---|---|
| Found: | C 64.37, | H 6.91, | N 9.08 |

Nuclear Magnetic Resonance spectrum ($\tau$) (in $CDCl_3$)

2.03 (2H, d. J=15 c.p.s. aromatic H of 3-phenyl)
3.10 (2H, d. J=15 c.p.s. aromatic H of 3-phenyl).
5.78 (2H, q. J=12 c.p.s, —CH$_2$—CH$_3$)

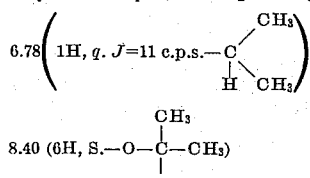

8.40 (6H, S.—O—C(CH$_3$)$_2$—CH$_3$)

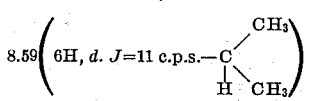

8.80 (3H, t., J=12 c.p.s, —CH$_2$—CH$_3$)

EXAMPLE 4

A solution of 2.0 parts of 4-(ethoxycarbonyl-1,1-dimethyl-methoxy)benzamidoxime in 5 volume parts of benzoyl chloride is heated at 130 to 140°C for 3 hours and then the reaction mixture is poured into 100 volume parts of ice water. The whole mixture is alkalified with a 10 percent aqueous solution of sodium hydroxide and the separated oily substance is extracted with chloroform. The chloro-form layer is washed with water, dried and then concentrated under reduced pressure.

The residue is treated with silica-gel column-chromatography to give 1.6 parts 3-[4-(ethoxycarbonyl-1,1-dimethyl-methoxy)phenyl]-5-phenyl-1,2,4-oxadiazole as a colorless oily substance. Yield: 51.2 percent Analysis: Calculated for $C_{26}H_{20}N_2O_4$:

|  | C 68.17, | H 5.79, | N 7.95 |
|---|---|---|---|
| Found: | C 67.92, | H 5.78, | N 7.45 |

Nuclear Magnetic Resonance spectrum ($\tau$) (in $CDCl_3$)

1.94 (2H, d., J=15 c.p.s., aromatic H of 3-phenyl).
2.40 to 2.66 (5H, m. aromatic H of 5-phenyl).
3.06 (2H, d., J=15 c.p.s., aromatic H of 3-phenyl).
5.48 (2H, q., J=12 c.p.s., —O—CH$_2$- ).

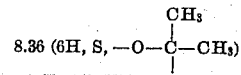

8.78 (3H, t., J=12 c.p.s., —CH$_2$—CH$_3$)

EXAMPLE 5

A solution of 2.5 parts of 4-(ethoxycarbonyl-1,1-dimethyl-methoxy)benzamidoxime and 1.8 parts of furoyl chloride in 5 volume parts of pyridine is heated at 130 to 140°C for 2.5 hours, and the reaction mixture is poured into 100 volume parts of ice water.

The separated oily substance is extracted with ethyl acetate and the ethyl acetate layer is washed with water, dried over anhydrous sodium sulfate, followed by distillation under reduced pressure to remove ethyl acetate. The residue is treated with silica-gel column-chromatography to give 1.2 parts of 3-[4-(ethoxycarbonyl-1,1-dimethyl-methoxy)phenyl]-5-(2-furyl)-1,2,4-oxadiazole as colorless needles melting at 41 to 43°C. Yield: 37.3 percent Analysis: Calculated for $C_{18}H_{18}O_5N_2$:

|  | C 63.15, | H 5.30, | N 8.18 |
|---|---|---|---|
| Found: | C 63.04, | H 5.40, | N 7.93 |

EXAMPLE 6

A solution of 1.5 parts of 4-(1-ethoxycarbonyl-ethoxy)benzamidoxime and 1.6 parts of nicotinic acid chloride in 7 volume parts of pyridine is refluxed for 3.5 hours. The reaction mixture is poured into 75 volume parts of ice water and the whole mixture is alkalified with a 10 percent aqueous solution of sodium hydroxide. The separated oily substance is extracted with chloroform and the chloroform layer is washed with water, dried over anhydrous sodium sulfate, followed by distillation under reduced pressure to remove the chloroform. The residue is treated with silica-gel column-chromatography to give 0.8 part of 3-[4-(1-ethoxycarbonyl-ethoxy)phenyl]-5-(3-pyridyl)-1,2,4-oxadiazole as pale red flakes melting at 103 to 105°C. Yield: 39.7 percent Analysis: Calculated for $C_{18}H_{17}O_4N_3$:

|  | C 63.71, | H 5.05, | N 12.38 |
|---|---|---|---|
| Found: | C 64.13, | H 5.19, | N 12.20 |

EXAMPLE 7

To a solution of 1.3 parts of 4-(ethoxycarbonyl-1,1-dimethyl-methoxy)benzamidoxime in 5 volume parts of pyridine is added 0.9 part of 4-(t-butyl)benzoyl chloride and the whole mixture is refluxed for 2.5 hours. The reaction mixture is poured into 50 volume parts of ice water and the separated oily substance is extracted with 50 volume parts of chloroform. The chloroform layer is washed with a 10 percent aqueous solution of sodium hydroxide, water, a 10 percent hydrochloric acid and water in this order, followed by drying. The chloroform layer is then subjected to distillation under reduced pressure to leave a pale yellow-brown oily substance. The oily substance is treated with silica-gel column-chromatography to give 1.0 part of 3-[4-(ethoxycarbonyl-1,1-dimethyl-methoxy)phenyl]-5-[4-(t-butyl)phenyl]-1,2,4-oxadiazole as colorless needles melting at 69 to 70°C. Yield: 65.0 percent.
Analysis: Calculated for $C_{24}H_{28}N_2O_4$:

|  | C 70.56, | H 6.91, | N 6.86 |
|---|---|---|---|
| Found | C 70.67, | H 6.79, | N 6.42 |

EXAMPLE 8

To a solution of 1.0 part of 4-(ethoxycarbonyl-1,1-dimethyl-methoxy)benzamidoxime in 5 volume parts of pyridine is added 1.4 parts of 4-nitrobenzoyl chloride, and the whole mixture is refluxed for 2 hours. The reaction mixture is poured into 50 volume parts of ice water and the separated oily substance is extracted with 50 volume parts of chloroform.

The chloroform layer is washed with a 10 percent aqueous solution of sodium hydroxide, water, a 10 percent hydrochloric acid and water in this order, followed by drying. The chloroform layer is then subjected to distillation under reduced pressure to leave 1.8 parts of yellow crystals.

The crystals are recrystallized from a mixture of benzene and petroleum benzine to give 1.1 parts of 3-[4-(ethoxycarbonyl-1,1-dimethyl-methoxy)phenyl]-5-(4-nitrophenyl)-1,2,4-oxadiazole as yellow needles melting at 91°C. Yield: 73.5 percent.
Analysis: Calculated for $C_{20}H_{19}N_3O_6$:

|  | C 60.45, | H 4.82, | N 10.58 |
|---|---|---|---|
| Found: | C 60.53, | H 4.83, | N 10.33 |

EXAMPLE 9

To a solution of 1.0 part of 4-(ethoxycarbonyl-1,1-dimethyl-methoxy)benzamidoxime in 5 volume parts of pyridine is added 1.4 parts of 3-nitrobenzoyl chloride, and the whole mixture is refluxed for 2 hours.

The reaction mixture is poured into 50 volume parts of ice water and the whole mixture is subjected to extraction with 50 volume parts of chloroform. The chloroform layer is washed with a 10 percent aqueous solution of sodium hydroxide, water, a 10 percent hydrochloric acid and water in this order, followed by drying. The chloroform layer is then subjected to distillation under reduced pressure to leave 1.5 parts of pale yellow crystals.

The crystals are recrystallized from a mixture of benzene and petroleum benzine to give 1.1 parts of 3-[4-(ethoxycarbonyl-1,1-dimethyl-methoxy)phenyl]-5-(3-nitrophenyl)-1,2,4-oxadiazole as pale yellow needles melting at 112 to 114°C. Yield: 73.7 percent
Analysis: Calculated for $C_{20}H_{19}N_3O_6$:

|  | C 60.45, | H 4.82, | N 10.58 |
|---|---|---|---|
| Found: | C 60.48, | H 4.77, | N 10.37 |

EXAMPLE 10

To a solution of 1.0 part of 4-(ethoxycarbonyl-1,1-dimethyl-methoxy)benzamidoxime in 5 volume parts of pyridine is added 0.9 part of 2-chlorobenzoyl chloride, and the whole mixture is heated at 120 to 130°C for 3.5 hours.

The reaction mixture is poured into 50 volume parts of ice water and the separated oily substance is extracted with 50 volume parts of chloroform. The chloroform layer is washed with a 10 percent aqueous solution of sodium hydroxide, water, a 10 percent hydrochloric acid, and water in this order, followed by drying. The chloroform layer is then subjected to distillation under reduced pressure to leave 1.7 parts of an oily substance.

The oily substance is treated with silica-gel column-chromatography to give 1.0 part of 3-[4-(ethoxycarbonyl-1,1-dimethyl-methoxy)phenyl]-5-(2-chlorophenyl)-1,2,4-oxadiazole as a pale yellow-brown oily substance. Yield: 69.0 percent
Analysis: Calculated for $C_{20}H_{19}N_2O_4Cl$:

|  | C 62.09, | H 4.95, | N 7.24 |
|---|---|---|---|
| Found: | C 61.83, | H 4.87, | N 6.85 |

Nuclear Magnetic Resonance spectrum ($\tau$) (in $CDCl_3$)
1.91 (2H, d. J=15 c.p.s., aromatic H of 3-phenyl)
2.44 to 2.73 (3H, m, aromatic H of 3-phenyl)
3.05 (2H, d. J=15 c.p.s. aromatic H of 3-phenyl)
5.80 (2H, q. J=12 c.p.s., —O—$CH_2$— )

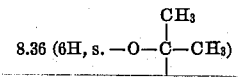
8.36 (6H, s. —O—C(CH$_3$)—CH$_3$)

8.88 (3H, t. J=12 c.p.s. —$CH_2$—$CH_3$)

EXAMPLE 11

To a solution of 1.0 part of 4-(ethoxycarbonyl-1,1-dimethyl-methoxy)benzamidoximime in 5 volume parts of pyridine is added 0.99 part of 3-chlorobenzoyl chloride, and the whole mixture is refluxed for 3.5 hours.

The reaction mixture is poured into 50 volume parts of ice water, and the separated oily substance is extracted with 50 volume parts of chloroform.

The chloroform layer is washed with a 10 percent aqueous solution of sodium hydroxide, water, a 10 percent hydrochloric acid and water in this order, followed by drying. The chloroform layer is then subjected to distillation under reduced pressure to leave 1.6 parts of a brown oily substance. The oily substance is treated with silica-gel column-chromatography to give 1.3 parts of 3-[4-(ethoxy-carbonyl- 1,1-dimethyl-methoxy)phenyl]-5-(3-chlorophenyl)-1,2,4-oxadiazole. Yield: 89.6 percent
Analysis: Calculated for $C_{20}H_{19}N_2O_4Cl$:

|  | C 62.09, | H 4.95, | N 7.24, | Cl 9.17 |
|---|---|---|---|---|
| Found: | C 62.39, | H 4.89, | N 6.95, | Cl 9.26 |

Nuclear Magnetic Resonance spectrum ($\tau$) (in $CDCl_3$)
1.78 to 2.00 (2H, m. aromatic H of 5-phenyl)
1.96 (2H, d. J=15 c.p.s., aromatic H of 3-phenyl)
2.48 to 2.58 (1H, m. aromatic H of 5-phenyl)
2.68 (1H, s. aromatic H of 5-phenyl)
3.07 (2H, d. J=15 c.p.s., aromatic H of 3-phenyl)
5.77 (2H, q. J=12 c.p.s., —O—$CH_2$— )

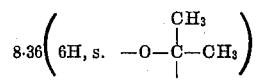
8.36 (6H, s. —O—C(CH$_3$)—CH$_3$)

8.88 (3H, t. J=12 c.p.s., —CH$_2$—CH$_3$)

EXAMPLE 12

To a solution of 1.0 part of 4-(ethoxycarbonyl-1,1-dimethyl-methoxy)benzamidoxime in 5 volume parts of pyridine is added 0.99 part of 4-chlorobenzoyl chloride, and the whole mixture is refluxed for 2 hours. The reaction mixture is poured into 50 volume parts of ice water and the separated crystals are extracted with chloroform. The chloroform layer is washed with a 10 percent aqueous solution of sodium hydroxide, water, a 10 percent hydrochloric acid, and water in this order, followed by drying. The chloroform layer is then subjected to distillation under reduced pressure to leave 1.8 parts of pale red crystals. The crystals are recrystallized from petroleum benzine to give 0.9 part of 3-[4-(ethoxycarbonyl-1,1-dimethyl-methoxy)-phenyl]-5-(4-chlorophenyl)-1,2,4-oxadiazole as pale red needles melting at 93 to 94°C. Yield: 62.0 percent Analysis: Calculated for C$_{20}$H$_{19}$N$_2$O$_4$Cl:

|  | C 62.09, | H 4.95, | N 7.24, | Cl 9.17 |
| --- | --- | --- | --- | --- |
| Found: | C 62.35, | H 4.93, | N 7.24, | Cl 9.16 |

EXAMPLE 13

To a solution of 1.0 part of 4-(ethoxycarbonyl-1,1-dimethyl-methoxy)benzamidoxime in 5 volume parts of pyridine is added 0.96 part of 2-methoxybenzoyl chloride, and the whole mixture is refluxed for 3.5 hours. The reaction mixture is poured into 50 volume parts of ice water and the whole mixture is subjected to extraction with 100 volume parts of chloroform. The chloroform layer is washed with a 10 percent aqueous solution of sodium hydroxide, water, a 10 percent hydrochloric acid and water in this order, followed by drying. The chloroform layer is then subjected to distillation under reduced pressure to leave 1.7 parts of a colorless oily substance. The oily substance is treated with silica-gel column-chromatography to yield 1.0 part of 3-[4-(ethoxycarbonyl-1,1-dimethyl-methoxy)phenyl]-5-(2-methoxyphenyl)-1,2,4-oxadiazole as colorless plates melting at 79 to 80°C. Yield: 69.0 percent Analysis: Calculated for C$_{21}$H$_{22}$N$_2$O$_4$:

|  | C 65.95, | H 5.80, | N 7.33 |
| --- | --- | --- | --- |
| Found: | C 65.67, | H 5.78, | N 6.84 |

EXAMPLE 14

To a solution of 1.0 part of 4-(ethoxycarbonyl-1,1-dimethyl-methoxy)benzamidoxime in 5 volume parts of pyridine is added 0.96 part of 4-methoxybenzoyl chloride, and the whole mixture is refluxed for 3 hours. The reaction mixture is poured into 50 volume parts of ice water and the separated oily substance is extracted with 100 volume parts of chloroform. The chloroform layer is washed with a 10 percent aqueous solution of sodium hydroxide, water, a 10 percent hydrochloric acid and water in this order, followed by drying. The chloroform layer is then subjected to distillation under reduced pressure to leave 1.5 parts of colorless crystals. The crystals are recrystallized from methyl alcohol to give 0.9 part of 3-[4-(ethoxycarbonyl-1,1-dimethyl-methoxy)-phenyl]-5-(4-methoxyphenyl)-1,2,4-oxadiazole as colorless needles melting at 83 to 85°C. Yield: 62.6 percent Analysis: Calculated for C$_{21}$H$_{22}$N$_2$O$_4$:

|  | C 65.95, | H 5.80, | N 7.33 |
| --- | --- | --- | --- |
| Found: | C 66.04, | H 5.89, | N 7.05 |

EXAMPLE 15

To a solution of 1.0 part of 4-(ethoxycarbonyl-1,1-dimethyl-methoxy)benzamidoxime in 5 volume parts of pyridine is added 0.91 part of 4-aminobenzoyl chloride, and the whole mixture is refluxed for 2 hours. The reaction mixture is concentrated under reduced pressure. To the residue is added 10 volume parts of a 10 percent aqueous solution of sodium hydroxide and the whole mixture is subjected to extraction with 50 volume parts of chloroform.

The chloroform layer is washed with water, dried and concentrated to dryness. This procedure gives a brown oily substance.

The oily substance is treated with silica-gel column-chromatography to give 1.3 parts of 3-[4-(ethoxy-carbonyl-1,1-dimethyl-methoxy)phenyl]-5-(4-aminophenyl)-1,2,4-oxadiazole as pale brown short needles melting at 109 to 111°C. Yield: 92.4 percent.

Analysis: Calculated for C$_{20}$H$_{21}$N$_3$O$_4$:

|  | C 65.38, | H 5.76, | N 11.44 |
| --- | --- | --- | --- |
| Found: | C 65.02, | H 5.65, | N 11.71 |

EXAMPLE 16

To a solution of 2.0 parts of 4-(ethoxycarbonyl-1,1-dimethyl-methoxy)benzamidoxime in 10 volume parts of pyridine is added 1.82 parts of 3-aminobenzoyl chloride, and the whole mixture is refluxed for 2 hours. The reaction mixture is concentrated under reduced pressure, and to the residue is added 20 volume parts of a 10 percent aqueous solution of sodium hydroxide. The whole mixture is subjected to extraction with 50 volume parts of chloroform and the chloroform layer is washed with water, followed by drying. The chloroform layer is then subjected to distillation under reduced pressure to leave a brown oily substance. The oily substance is treated with silica-gel column-chromatography to give 1.3 parts of 3-[4-(ethoxycarbonyl-1,1-dimethyl-methoxy)phenyl]-5-(3-aminophenyl)-1,2,4-oxadiazole as a pale brown oily substance. Yield: 54.4 percent.

Analysis: Calculated for C$_{20}$H$_{21}$N$_3$O$_4$:

|  | C 65.38, | H 5.76, | N 11.44 |
| --- | --- | --- | --- |
| Found: | C 65.41, | H 5.91, | N 11.03 |

Nuclear Magnetic Resonance spectrum ($\tau$) (in CDCl$_3$)

1.96 (2H, d. J=15 c.p.s. aromatic H of 3-phenyl)
2.39 to 2.86 (2H, m. aromatic H of 5-phenyl)
2.50 (1H, s. aromatic H of 5-phenyl)
3.04 to 3.26 (1H, m. aromatic H of 5-phenyl)
3.07 (2H, d. J=15 c.p.s. aromatic H of 3-phenyl)
5.77 (2H, q. J=12 c.p.s. —O—CH$_2$—)
6.10 to 6.38 (2H, b. —NH$_2$)

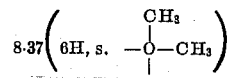

8.88 (3H, t. J=12 c.p.s. —CH$_2$—CH$_3$)

EXAMPLE 17

A solution of 1.3 parts of 4-(ethoxycarbonyl-1,1-dimethyl-methoxy)benzamidoxime and 1.7 parts of 2-thienoyl chloride in a mixture of 2 volume parts of triethylamine and 10 volume parts of dioxane is heated at 120 to 130°C for 4 hours, and the reaction mixture is poured into 100 volume parts of ice water.

The separated oily substance is extracted with ethyl acetate and the organic layer is washed with water, dried over anhydrous sodium sulfate, followed by distillation under reduced pressure. The residue is treated with silica-gel column-chromatography to give 1.5 parts of 3-[4-ethoxycarbonyl-1,1-dimethyl-methoxy)phenyl]-5-(2-thienyl)-1,2,4-oxadiazole as colorless needles melting at 89 to 91°C. Yield: 85.7 percent.

Analysis: Calculated for $C_{18}H_{18}N_2O_4S$ :

|  | C 60.33, | H 5.06, | N 7.82 |
|---|---|---|---|
| Found: | C 60.41, | H 5.23, | N 7.53 |

EXAMPLE 18

A solution of 1.3 parts of 4-(ethoxycarbonyl-1,1-dimethyl-methoxy)benzamidoxime and 1.9 parts of phenyl-acetyl chloride in a mixture of 2 volume parts of triethylamine and 10 volume parts of dioxane is heated at 120 to 130°C for 4 hours and the reaction mixture is poured into 100 volume parts of ice water.

The separated oily substance is extracted with ethyl acetate and the organic layer is washed with water, dried over anhydrous sodium sulfate, followed by distillation under reduced pressure. The residue is treated with silica-gel column-chromatography to give 1.6 parts of 3-[4-(ethoxycarbonyl-1,1-dimethyl-methoxy)phenyl]-5-benzyl-1,2,4-oxadiazole as a pale yellow oily substance. Yield: 89.5 percent Analysis: Calculated for $C_{21}H_{22}N_2O_4$ :

|  | C 68.83, | H 6.05, | N 7.65 |
|---|---|---|---|
| Found: | C 68.79, | H 6.22, | N 7.61 |

Nuclear Magnetic Resonance spectrum ($\tau$) (in $CDCl_3$).
2.02 (2H, d. J=15 c.p.s. aromatic H of 3-phenyl)
2.67 (5H, s. aromatic H of benzyl)
3.10 (2H, d. J=15 c.p.s. aromatic H of 3-phenyl)

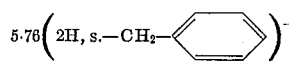

5.80 (2H, q. J=12 c.p.s. —CH₂—CH₃).

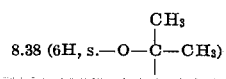

8.80 (3H, t. J=12 c.p.s. —CH₂—CH₃).

EXAMPLE 19

A solution of 1.3 parts of 4-(ethoxycarbonyl-1,1-dimethyl-methoxy)benzamidoxime and 2.0 parts of cyclohexylacetyl chloride in a mixture of 2 volume parts of triethylamine and 10 volume parts of dioxane is heated at 130 to 140°C for 5 hours, and the reaction mixture is poured into 100 volume parts of ice water.

The separated oily substance is extracted with ethyl acetate and the organic layer is washed with water, dried over anhydrous sodium sulfate, followed by distillation under reduced pressure.

The residue is treated with silica-gel column-chromatography to give 1.6 parts of 3-[4-(ethoxycarbonyl-1,1-dimethyl-methoxy)phenyl]-5-(cyclohexyl-methyl)-1,2,4-oxadiazole as a pale yellow-brown oily substance. Yield: 88.0 percent.

Analysis: Calculated for $C_{21}H_{28}N_2O_4$:

|  | C 67.72, | H 7.58, | N 7.52 |
|---|---|---|---|
| Found: | C 67.45, | H 7.56, | N 7.32 |

Nuclear Magnetic Resonance spectrum ($\tau$) (in $CDCl_3$).
2.02 (2H, d. J=15 c.p.s. aromatic H of 3-phenyl)
3.09 (2H, d. J=15 c.p.s. aromatic H of 3-phenyl)
5.76 (2H, q. J=12 c.p.s. —O—CH₂—CH₃ ).

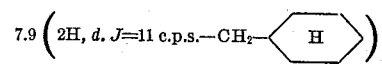

8.02 to 8.90 (11H, m. H of cyclohexyl).

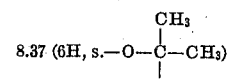

8.80 (3H, t. J=12 c.p.s. —CH₂—CH₃)

EXAMPLE 20

A solution of 1.3 parts of 4-(ethoxycarbonyl-1,1-dimethyl-methoxy)benzamidoxime and 2.0 parts of octanoyl chloride in a mixture of 2 volume parts of triethylamine and 10 volume parts of dioxane is heated at 120 to 130°C for 5 hours and the reaction mixture is poured into 100 volume parts of ice water. The separated oily substance is extracted with ethyl acetate, and the organic layer is washed with water, dried over anhydrous sodium sulfate, followed by distillation under reduced pressure. The residue is treated with silica-gel column chromatography to give 1.7 parts of 3-[4-(ethoxycarbonyl-1,1-dimethyl-methoxy)phenyl]-5-heptyl-1,2,4-oxadiazole as a pale yellow oily substance. Yield: 93.0 percent.

Analysis: Calculated for $C_{21}H_{30}N_2O_4$ :

|  | C 67.35, | H 8.08, | N 7.48 |
|---|---|---|---|
| Found: | C 67.36, | H 8.46, | N 7.20 |

Nuclear Magnetic Resonance spectrum ($\tau$) (in $CDCl_3$).
2.03 (2H, d. J=15 c.p.s. aromatic H of 3-phenyl)
3.09 (2H, d. J=15 c.p.s. aromatic H of 3-phenyl)
5.77 (2H, q. J=12 c.p.s. -O-CH₂-CH₃).

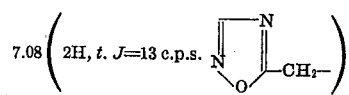

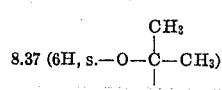

8.66 to 9.12 (16H, m. —CH$_2$—CH$_3$, —(CH$_2$)$_5$—CH$_3$)

EXAMPLE 21

A solution of 1.3 parts of 4-(ethoxycarbonyl-1,1and 2.7 parts of palmitic anhydride in 10 volume parts of dioxane is heated at 130 to 140°C for 5 hours, and the reaction mixture is poured into 100 volume parts of ice water. The separated oily substance is extracted with ethyl acetate and the organic layer is washed with a 10 percent aqueous solution of sodium hydroxide, and then water, dried over anhydrous sodium sulfate, followed by distillation under reduced pressure. The residue is treated with silica-gel column-chromatography to give 1.5 parts of 3-[4-(ethoxycarbonyl-1,1-dimethyl-methoxy)phenyl]-5-pentadecyl-1,2,4-oxadiazole as colorless needles melting at 35 to 37° C. Yield: 73.3 percent Analysis: Calculated for C$_{29}$H$_{46}$N$_2$O$_4$:

|  | C 71.57, | H 9.53, | N 5.76 |
|---|---|---|---|
| Found: | C 71.56, | H 9.86, | N 5.69 |

EXAMPLE 22

A solution of 2.0 parts of 4-(1-ethoxycarbonyl-1-phenyl-methoxy)benzamidoxime and 1.3 parts of nicotinoyl chloride hydrochloride in a mixture of 2 volume parts of triethylamine and 10 volume parts of dioxane is heated at 120 to 130°C for 2 hours, and the reaction mixture is poured into 100 volume parts of ice water.

The separated oily substance is extracted with ethyl acetate and the organic layer is washed with water, dried over anhydrous sodium sulfate, followed by distillation under reduced pressure. The residue is treated with silica-gel column-chromatography to give 1.7 parts of 3-[4-(1-ethoxycarbonyl-1-phenyl-methoxy)phenyl]-5-(3-pyridyl)-1,2,4-oxadiazole as colorless needles melting at 89 to 91°C. Yield: 66.6 percent.

Analysis: Calculated for C$_{23}$H$_{19}$N$_3$O$_4$:

|  | C 68.81, | H 4.77, | N 10.47 |
|---|---|---|---|
| Found: | C 68.47, | H 4.65, | N 10.18 |

EXAMPLE 23

A solution of 3.0 parts of 4-(1-ethoxycarbonyl-nonyloxy)benzamidoxime and 1.7 parts of nicotinoyl chloride hydrochloride in a mixture of 2 volume parts of triethylamine and 10 volume parts of dioxane is heated at 120 to 130°C for 2 hours, and the reaction mixture is poured into 100 volume parts of ice water. The separated oily substance is extracted with ethyl acetate and the organic layer is washed with water, dried over anhydrous sodium sulfate, followed by distillation under reduced pressure. The residue is treated with silica-gel column-chromatography to give 1.6 parts of 3-[4-(1-ethoxycarbonyl-nonyloxy)-phenyl]-5-(3-pyridyl)-1,2,4-oxadiazole as a pale yellow-brown oily substance. Yield: 42.9 percent.

Analysis: Calculated for C$_{25}$H$_{31}$N$_3$O$_4$:

|  | C 68.63, | H 7.14, | N 9.61 |
|---|---|---|---|
| Found: | C 68.30, | H 7.01, | N 9.30 |

Nuclear Magnetic Resonance spectrum (τ) (in CDCl$_3$)

0.60 (1H, d. J=3 c.p.s. aromatic H of 5-pyridyl)
1.20 (1H, q. J=9 c.p.s., J=3 c.p.s. aromatic H of 5-pyridyl).
1.58 (1H, Se. J=9 c.p.s., J=3 c.p.s. aromatic H of 5-pyridyl).
1.93 (2H, d. J=15 c.p.s. aromatic H of 3-phenyl)
2.54 (1H, q. J=15 c.p.s., J=9 c.p.s. aromatic H of 5-pyridyl)
3.01 (2H, d. J=15 c.p.s. aromatic H of 3-phenyl)

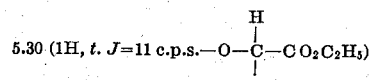

5.30 (1H, t. J=11 c.p.s. —O—C̣H—CO$_2$C$_2$H$_5$)

5.77 (2H, q. J=12 c.p.s. —O—CH$_2$—CH$_3$).

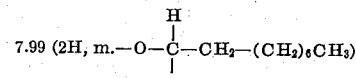

7.99 (2H, m.—O—C̣H—CH$_2$—(CH$_2$)$_6$CH$_3$)

8.64 to 9.22 (18 H, m. —O—CH$_2$—CH$_3$, —(CH$_2$)$_6$CH$_3$)

EXAMPLE 24

A solution of 3.0 parts of 4-(1-ethoxycarbonyl-1-cyclohexyl-methoxy)benzamidoxime and 2.0 parts of nicotinoyl chloride hydrochloride in a mixture of 2 volume parts of triethylamine and 20 volume parts of dioxane is heated at 120 to 130°C for 2 hours.

The reaction mixture is poured into 200 volume parts of ice water. The separated oily substance is extracted with ethyl acetate and the organic layer is washed with water, dried over anhydrous sodium sulfate, followed by distillation under reduced pressure. The residue is treated with silica-gel column-chromatography to give 1.0 part of 3-[4-(1-ethoxycarbonyl-1-cyclohexyl-methoxy)-phenyl]-5-(3-pyridyl)-1,2,4-oxadiazole as colorless needles melting at 105 to 107°C. Yield: 24.2 percent Analysis: Calculated for C$_{23}$H$_{25}$N$_3$O$_4$:

|  | C 67.79, | H 6.18, | N 10.31 |
|---|---|---|---|
| Found: | C 67.46, | H 6.08, | N 10.42 |

EXAMPLE 25

A solution of 3.0 parts of 4-(1-ethoxycarbonyl-pentyloxy)benzamidoxime and 2.7 parts of nicotinoyl chloride hydrochloride in 15 volume parts of pyridine is heated at 130 to 140°C for 2 hours, and the reaction mixture is poured into 150 volume parts of ice water. The separated oily substance is extracted with chloroform and the organic layer is washed with water, dried over anhydrous sodium sulfate, followed by distillation under reduced pressure. The residue is treated with silica-gel column-chromatography to give 2.7 parts of 3-[4-(1-ethoxycarbonyl-pentyloxy)phenyl]-5-(3-pyridyl)-1,2,4-oxadiazole as a pale brown oily substance. Yield: 69.5 percent.

Analysis: Calculated for C$_{21}$H$_{23}$N$_3$O$_4$:

|  | C 66.12, | H 6.08, | N 11.02 |
|---|---|---|---|
| Found: | C 65.74, | H 6.20, | N 10.85 |

Nuclear Magnetic Resonance spectrum (τ) (in CDCl$_3$)

0.60 (1H, d. J=3 c.p.s. aromatic H of 5-pyridyl).

1.19 (1H, q. J=9 c.p.s., J=3 c.p.s. aromatic H of 5-pyridyl).
1.58 (1H. Se. J=15 c.p.s., J=3 c.p.s. aromatic H of 5-pyridyl).
1.93 (1H, d. J=15 c.p.s. aromatic H of 3-phenyl)
2.54 (1H, q. J=15 c.p.s. J=9 c.p.s. aromatic H of 5-pyridyl)
3.02 (2H, d. J=15 c.p.s. aromatic H of 3-phenyl)

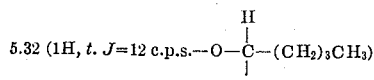

5.32 (1H, t. J=12 c.p.s.—O—C—(CH₂)₃CH₃)

5.78 (2H, q. J=12 c.p.s. —O—CH₂—CH₃)
7.90 to 9.20 (12H, m. —O—CH₂—CH₃, —(CH₂)₃—CH₃)

After a similar manner to the above examples, the following compounds are prepared:

3-[4-(Benzyloxycarbonyl-1,1-dimethyl-methoxy)phenyl]-5-(3-pyridyl)-1,2,4-oxadiazole melting at 72 to 73°C 3-[4-(Carbamoyl-1,1-dimethyl-methoxy)phenyl]-5-(3-pyridyl)-1,2,4-oxadiazole melting at 174 to 175°C 3-[4-(Butoxycarbonyl-1,1-dimethyl-methoxy)phenyl]-5-(3-pyridyl)-1,2,4-oxadiazole melting at 82 to 84°C 3-[4-(Carboxy-1,1-dimethyl-methoxy)phenyl]-5-(3-pyridyl)-1,2,4-oxadiazole melting at 195 to 197°C.

What we claim is:

1. A compound of the general formula

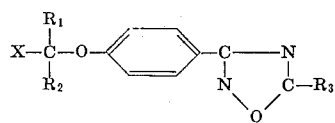

wherein X represents carboxyl, carbo-lower alkoxy or carbamoyl, each of R₁ and R₂ represents a hydrogen atom, carbobenzyloxy, lower alkyl group or one of said terms represents cyclohexyl, or phenyl; R₃ is a number selected from the group consisting of alkyl having one to four carbon atoms, linear alkyl having from five to 17 carbon atoms, cyclohexyl, cyclohexylmethyl, benzyl, phenethyl, phenyl, lower-alkylphenyl, lower-alkoxyphenyl, halophenyl, aminophenyl, nitrophenyl, pyridyl, furyl, or theinyl or its pharmaceutically acceptable salts.

2. A compound as claimed in claim 1, wherein R₃ is a linear alkyl group having five to seven carbon atoms.

3. A compound as claimed in claim 1, wherein R₃ is a linear alkyl group having 15 to 17 carbon atoms.

4. A compound as claimed in claim 1, wherein R₃ is phenyl which may be substituted.

5. A compound as claimed in claim 1, wherein R₃ is phenethyl group which may be substituted.

6. A compound as claimed in claim 1, wherein the compound is 3-[4-(ethoxycarbonyl-1,1-dimethyl-methoxy)-phenyl]-5-(3-pyridyl)-1,2,4-oxadiazole.

7. A compound as claimed in claim 1, wherein the compound is 3-[4-(ethoxycarbonyl-1,1-dimethyl-methoxy)phenyl]-5-(4-pyridyl)-1,2,4-oxadiazole.

8. A compound as claimed in claim 1, wherein the compound is 3-[4-(ethoxycarbonyl-1,1-dimethyl-methoxy)phenyl]-5-isopropyl-1,2,4-oxadiazole.

9. A compound as claimed in claim 1, wherein the compound is 3-[4-(ethoxycarbonyl-1,1-dimethyl-methoxy)-phenyl]-5-phenyl-1,2,4-oxadiazole.

10. A compound as claimed in claim 1, wherein the compound is 3-[4-(ethoxycarbonyl-1,1-dimethyl-methoxy)-phenyl]-5-(2-furyl)-1,2,4-oxadiazole.

11. A compound as claimed in claim 1, wherein the compound is 3-[4-(1-ethoxycarbonyl-ethoxy)phenyl]-5-(3-pyridyl)-1,2,4-oxadiazole.

12. A compound as claimed in claim 1, wherein the compound is 3-[4-(ethoxycarbonyl-1,1-dimethyl-methoxy)-phenyl]-5-[4-(t-butyl)phenyl]-1,2,4-oxadiazole.

13. A compound as claimed in claim 1, wherein the compound is 3-[4-(ethoxycarbonyl-1,1-dimethyl-methoxy)-phenyl]-5-(4-nitrophenyl)-1,2,4-oxadiazole.

14. A compound as claimed in claim 1, wherein the compound is 3-[4-(ethoxycarbonyl-1,1-dimethyl-methoxy)-phenyl]-5-(3-nitrophenyl)-1,2,4-oxadiazole.

15. A compound as claimed in claim 1, wherein the compound is 3-[4-(ethoxycarbonyl-1,1-dimethyl-methoxy)-phenyl]-5-(2-chlorophenyl)-1,2,4-oxadiazole.

16. A compound as claimed in claim 1, wherein the compound is 3-[4-(ethoxycarbonyl-1,1-dimethyl-methoxy)-phenyl]-5-(3-chlorophenyl)-1,2,4-oxadiazole.

17. A compound as claimed in claim 1, wherein the compound is 3-[4-(ethoxycarbonyl-1,1-dimethyl-methoxy)-phenyl]-5-(4-chlorophenyl)-1,2,4-oxadiazole.

18. A compound as claimed in claim 1, wherein the compound is 3-[4-(ethoxycarbonyl-1,1-dimethyl-methoxy)-phenyl]-5-(2-methoxyphenyl)-1,2,4-oxadiazole.

19. A compound as claimed in claim 1, wherein the compound is 3-[4-(ethoxycarbonyl-1,1-dimethyl-methoxy)-phenyl]-5-(4-methoxyphenyl)-1,2,4-oxadiazole.

20. A compound as claimed in claim 1, wherein the compound is 3-[4-(ethoxycarbonyl-1,1-dimethyl-methoxy)-phenyl]-5-(4-aminophenyl)-1,2,4-oxadiazole.

21. A compound as claimed in claim 1, wherein the compound is 3-[4-(ethoxycarbonyl-1,1-dimethyl-methoxy)-phenyl]-5-(3-aminophenyl)-1,2,4-oxadiazole.

22. A compound as claimed in claim 1, wherein the compound is 3-[4-(ethoxycarbonyl-1,1-dimethyl-methoxy)-phenyl]-5-(2-thienyl)-1,2,4-oxadiazole.

23. A compound as claimed in claim 1, wherein the compound is 3-[4-(ethoxycarbonyl-1,1-dimethyl-methoxy)-phenyl]-5-benzyl-1,2,4-oxadiazole.

24. A compound as claimed in claim 1, wherein the compound is 3-[4-(ethoxycarbonyl-1,1-dimethyl-methoxy)phenyl]-5-(cyclohexyl-methyl)-1,2,4-oxadiazole.

25. A compound as claimed in claim 1, wherein the compound is 3-[4-(ethoxycarbonyl-1,1-dimethyl-methoxy)phenyl]-5-heptyl-1,2,4-oxadiazole.

26. A compound as claimed in claim 1, wherein the compound is 3-[4-(ethoxycarbonyl-1,1-dimethyl-methoxy)phenyl]-5-pentadecyl-1,2,4-oxadiazole.

27. A compound as claimed in claim 1, wherein the compound is 3-[4-(1-ethoxycarbonyl-1-phenyl-methoxy)phenyl]-5-(3-pyridyl)-1,2,4-oxadiazole.

28. A compound as claimed in claim 1, wherein the compound is 3-[4-(1-ethoxycarbonyl-nonyloxy)phenyl]-5-(3-pyridyl)-1,2,4-oxadiazole.

29. A compound as claimed in claim 1, wherein the compound is 3-[4-(1-ethoxycarbonyl-1-cyclohexyl-methoxy)phenyl]-5-(3-pyridyl)-1,2,4-oxadiazole.

30. A compound as claimed in claim 1, wherein the compound is 3-[4-(1-ethoxycarbonyl-pentyloxy)phenyl]-5-(3-pyridyl)-1,2,4-oxadiazole.

31. A compound as claimed in claim 1, wherein the compound is 3-[4-(benzyloxycarbonyl-1,1-dimethyl-methoxy)phenyl]-5-(3-pyridyl)-1,2,4-oxadiazole.

32. A compound as claimed in claim 1, wherein the compound is 3-[4-(carbamoyl-1,1-dimethyl-methoxy)phenyl]-5-(3-pyridyl)-1,2,4-oxadiazole.

33. A compound as claimed in claim 1, wherein the compound is 3-[4-(butoxycarbonyl-1,1-dimethyl-methoxy)phenyl]-5-(3-pyridyl)-1,2,4-oxadiazole.

34. A compound as claimed in claim 1, wherein the compound is 3-[4-(carboxy-1,1-dimethyl-methoxy)phenyl]-5-(3-pyridyl)-1,2,4-oxadiazole.

* * * * *